Jan. 18, 1944. R. G. LE TOURNEAU 2,339,643
DOUBLE CONE CLUTCH
Filed June 17, 1942
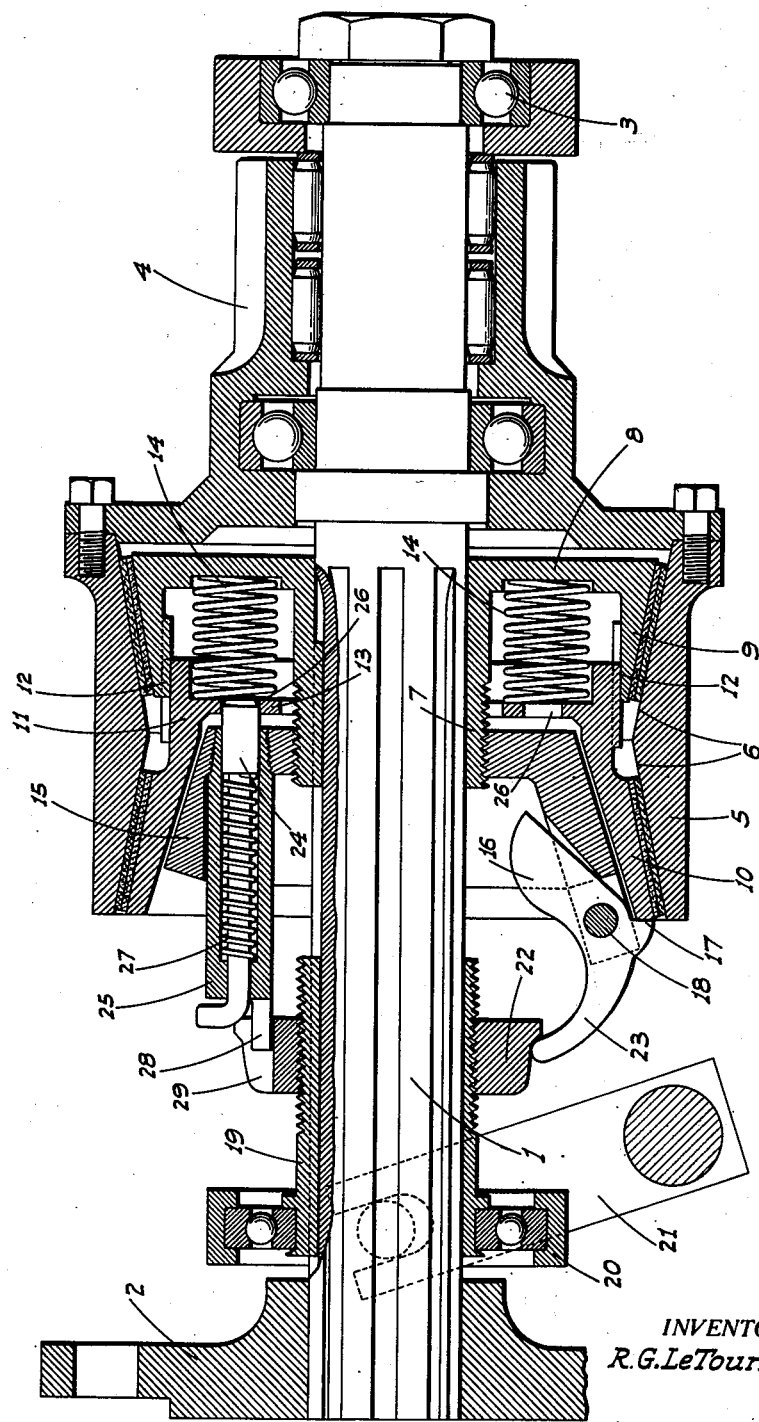
INVENTOR.
R. G. LeTourneau
ATTORNEY.

Patented Jan. 18, 1944

2,339,643

UNITED STATES PATENT OFFICE 2,339,643

DOUBLE CONE CLUTCH

Robert G. Le Tourneau, Peoria, Ill., assignor to R. G. Le Tourneau, Inc., Stockton, Calif., a corporation of California Application June 17, 1942, Serial No. 447,322

7 Claims. (Cl. 192—68)

This invention relates to double cone clutches, and particularly represents improvements over the clutch structure of my Patent No. 2,229,754, dated January 28, 1941.

One object of the present invention is to improve and simplify the mounting of the opposed cooperating clutch elements relative to each other and to the drive shaft so that greater compactness and sturdiness is obtained.

Another object is to provide an improved device for adjusting the dog engaging cam ring and dogs as wear in the clutch develops, so that the same shifting movement of the ring and operating lever may be obtained irrespective of the adjusted position of the dogs. Also the adjustment of the parts to obtain the above result is effected by manual release of a single holding element which avoids the necessity of tools of any kind being used in making an adjustment, and thus avoids the difficulties frequently had when trying to operate or manipulate tools within the confines of a clutch housing, as must usually be done.

The above and other objects I accomplish by means of such structure and relative arrangement of parts as will fully appear by a perusal of the following specification and claims.

The figure on the drawing is a sectional elevation of my improved clutch.

Referring now more particularly to the characters of reference on the drawing, the numeral 1 denotes the drive shaft having a driving flange 2 at its forward end and journaled at its rear end in a relatively fixed bearing 3.

Turnably journaled on the shaft 1 immediately ahead of the bearing 3 is a pinion 4 or similar member, on the forward end of which is secured a forwardly projecting female clutch member 5 having a pair of opposed flat angle bevel or cone clutch faces 6. Slidably splined on the shaft 1 ahead of the pinion and within member 5 is the hub 7 of a disc 8, which on its outer end carries a forwardly projecting male clutch member 9 adapted to cooperate with and engage the rearmost face 6 upon forward movement of said member 9.

Another male clutch member 10 is adapted to cooperate with and engage the foremost face 6 of the member 5 upon rearward movement of the member 10; said member 10 having a rearwardly projecting annular extension 11 having straight splines slidably engaging the internal splining on the member 9, as shown at 12. Full circle driving connection between the clutch members 9 and 10 therefore is made immediately adjacent the area of engagement of these members with the female clutch member. A disc-like web 13 projects radially inward from the extension 11, compression springs 14 between the web 13 and disc 8 tending to separate the clutch members and maintain the clutch disengaged.

Adjustably threaded on the hub 7 in front of the web 13 is a cage 15, disposed within the clutch member 10 and supporting pivoted clutch actuating dogs, one of which is shown at 16. Each dog has a short radial shoulder 17 disposed radially out from the dog pivot 18 and which faces and engages the outer annular edge of the clutch member 10. The dog is weighted rearwardly of the pivot and shoulder so that the latter tends to move away from the clutch element by reason of the centrifugal action set up upon rotation of the structure, and thus tends to prevent possible freezing of the clutch.

Slidably splined on the shaft 1 between the flange 2 and hub 7 is a sleeve 19 on which a collar 20 is turnably mounted, but which is held against axial movement relative to the sleeve, said collar being engaged by a shifting fork 21 in the conventional manner. Adjustably threaded on the sleeve is a cam ring 22, engaging fingers 23 formed with the dogs 16 and arranged so that upon forward movement of the sleeve, the dogs are turned on their pivots and the shoulders are forced rearwardly against the clutch member 10. As will be noted, the dogs are pivoted on the cage, which in turn is secured on the hub 7 of the clutch member 9. Rearward movement of the dog shoulders and clutch member 10 therefore is accomplished by forward movement of the clutch member 9, so that both clutch members are simultaneously moved into engagement with the clutch member 5 and with equalized pressures.

Rotation and adjustment of the cage 15 on the hub 7 is normally prevented by a manually retractible holding pin 24 disposed parallel to the shaft 1 and mounted for sliding movement in a sleeve 25 secured in and projecting forwardly from the cage. The rear end of the pin normally engages one of a number of orifices 26 in the web 13, the pin being normally urged rearwardly by a spring 27 in the sleeve 25. At its forward end the sleeve is formed with a projecting finger 28 extending parallel to the shaft and slidably engaging a recess 29 in the cam ring 22.

It will therefore be seen that the cam ring, the cage, and the adjacent clutch member 10 are all maintained in definite non-rotatable relation to each other, while allowing of relative axial movement of these parts.

In order to adjust the dogs as the wear of the clutch members brings them closer together, it is only necessary to retract the pin 24 from an orifice 26 and apply a rotative pressure to the cam ring or cage the necessary distance to advance the dogs the required amount to take up the slack or wear.

Since the cage and ring are connected, as far as rotation is concerned, by the finger 28, both rotate together, thus preventing any alteration in the relationship of the dogs and cam ring. In this connection it is to be understood that the pitch of the threads of the sleeve 19 and hub 7 are the same, so that the ring and cage will move axially the same distance with equal amounts of arcuate movement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a double cone clutch, a drive shaft, a female clutch member overhanging and turnable about said shaft as an axis, a pair of opposed male clutch elements of band-like form in and engageable with the female member upon relative axial movement of the elements in opposite directions, said elements being spaced apart axially of the shaft, a hub rigid with one element and slidably splined on the shaft, and an annular axial extension on the other element adjacent the female member and projecting into and slidably splined in said one element, whereby to provide full circle driving engagement between said elements radially out from the hub and adjacent the female member.

2. In a double cone clutch, a drive shaft, a female clutch member overhanging and turnable about said shaft as an axis, a pair of opposed male clutch elements engageable with the female member upon relative axial movement of the elements in opposite directions, means operatively connecting the elements and shaft for rotation therewith, and means to move the elements in said opposite directions including a dog to engage and advance one element, means adjustably mounting the dog in connection with the other element, a sleeve slidably splined on the shaft, a cam ring adjustable on the sleeve and engaging the dog to actuate the same upon axial movement of the ring, and means connecting the ring and dog mounting means for simultaneous adjustment along the shaft while allowing of independent axial movement of the ring.

3. A structure as in claim 2, with releasable means between the dog mounting means and the other element normally preventing adjustment of said mounting means.

4. A structure as in claim 2, in which said last named means comprises a finger fixed with and projecting from said dog mounting means axially of the shaft; the ring having a recess in which the finger slides.

5. A structure as in claim 2, with releasable holding means preventing adjustment of the mounting means without the ring and vice versa.

6. In a double cone clutch, a drive shaft, a female clutch member overhanging and turnable about said shaft as an axis, a pair of opposed male clutch elements engageable with the female member upon relative axial movement of the elements in opposite directions, means operatively connecting the elements and shaft for rotation therewith, and means to move the elements in said opposite directions, including a dog to engage and advance one element, means adjustably mounting the dog in connection with the other element, and including a hub rigid with said other element and a cage in which the dog is pivoted adjustably screwed on the hub, releasable holding means between the hub and cage normally preventing adjustment of the latter, a sleeve slidably splined on the shaft ahead of the hub, a cam ring adjustably screwed on the sleeve and engageable with the dog to actuate the same upon axial movement of the sleeve and ring and a connection between the cage and ring whereby they may be adjusted simultaneously upon release of the holding means while allowing of independent axial movement of the sleeve along the shaft.

7. A structure as in claim 6, in which said releasable holding means comprises a manually retractible pin mounted in the cage parallel to the shaft; said other clutch element having a radial web provided with circumferentially spaced openings to receive the end of the pin.

ROBERT G. LE TOURNEAU.